US008295191B2

(12) United States Patent
Leung et al.

(10) Patent No.: US 8,295,191 B2
(45) Date of Patent: Oct. 23, 2012

(54) ENDPOINT REPORT AGGREGATION IN UNIFIED COMMUNICATION SYSTEMS

(75) Inventors: Yiu-Ming Leung, Kirkland, WA (US); Jisun Park, Bellevue, WA (US); Vincent Allio, Beijing (CN); Danny Levin, Redmond, WA (US); Haoran Zheng, Beijing (CN); Xu Liu, Beijing (CN); Jay Herbison, Beijing (CN)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 12/042,153

(22) Filed: Mar. 4, 2008

(65) Prior Publication Data

US 2009/0225670 A1    Sep. 10, 2009

(51) Int. Cl.
*G01R 31/08* (2006.01)
(52) U.S. Cl. ..................................... 370/252; 379/32.01
(58) Field of Classification Search .... 379/32.01–32.03, 379/221.08; 370/209, 252
See application file for complete search history.

(56) References Cited

U.S. PATENT DOCUMENTS

| | | | |
|---|---|---|---|
| 5,126,990 A | 6/1992 | Efron et al. | 369/58 |
| 5,928,330 A | 7/1999 | Goetz et al. | 709/231 |
| 6,427,008 B1 * | 7/2002 | Balaz | 379/202.01 |
| 6,594,699 B1 | 7/2003 | Sahai et al. | 709/228 |
| 6,973,475 B2 | 12/2005 | Kenyon et al. | 709/203 |
| 2002/0022453 A1 | 2/2002 | Balog et al. | 455/41 |
| 2003/0145077 A1 | 7/2003 | Khan et al. | 709/224 |
| 2006/0007870 A1 * | 1/2006 | Roskowski et al. | 370/252 |
| 2006/0031749 A1 | 2/2006 | Schramm et al. | 715/500.1 |
| 2006/0198359 A1 * | 9/2006 | Fok et al. | 370/351 |
| 2007/0133403 A1 * | 6/2007 | Hepworth et al. | 370/229 |
| 2007/0242662 A1 | 10/2007 | Connor | 370/352 |
| 2007/0286351 A1 * | 12/2007 | Ethier et al. | 379/32.01 |
| 2008/0101338 A1 * | 5/2008 | Reynolds et al. | 370/352 |
| 2009/0164201 A1 * | 6/2009 | Celli et al. | 703/21 |

FOREIGN PATENT DOCUMENTS

WO    WO0209429 A2    1/2002

OTHER PUBLICATIONS

Providing Quality of Service Monitoring: Challenges and Approaches http://www.ece.nus.edu.sg/stfpage/eletck/papers/JYM_NOMS2000_162.pdf.
Integrated Quality of Service and Network Management http://www.ece.nus.edu.sg/stfpage/eletck/papers/Rohit_168.pdf.
Experiences with Processor Reservation and Dynamic QOS in Real-Time Mach http://www.cs.cmu.edu/afs/cs/project/rtmach/public/papers/mm-japan-96.pdf.

* cited by examiner

*Primary Examiner* — Anh-Vu Ly
*Assistant Examiner* — Matthew Hopkins
(74) *Attorney, Agent, or Firm* — Merchant & Gould PC

(57) ABSTRACT

User quality of experience in a real time communication system is determined by analyzing endpoint performance metric reports correlated with performance factors of each endpoint in an endpoint profile for a more complete view of an audio/video quality of experience. Reports may include endpoint profile reports, which may be sent once at the beginning and then again only if an endpoint attribute changes; session reports, which include measured metric information and are sent at the conclusion of each session; and session interval reports, which also include metric information, but are sent during the session based on a period or a predefined threshold.

19 Claims, 7 Drawing Sheets

ENDPOINT REPORT AGGREGATION IN UNIFIED COMMUNICATION SYSTEMS

BACKGROUND

As an alternative to Public Switched Telephone Network (PSTN) systems, cellular phone networks have proliferated over the last decade where users with cellular phones have access to one or more networks at almost any location. Also a recent development is the wide spread use of Voice over IP (VOIP) telephony, which uses internet protocol over wired and wireless networks. With the availability of such diverse types of communication networks and devices capable of taking advantage of various features of these networks, a new technology is bringing different communication networks together providing until now unavailable functionality such as combining various modes of communication (e.g. instant messaging, voice calls, video communications, etc.). This technology is referred to as unified communications (UC). A network of servers manages end devices capable of handling a wide range of functionality and communication while facilitating communications between the more modern unified communication network devices and other networks (e.g. PSTN, cellular, etc.).

In a system that supports multiple forms of communication, it is important for administrators to be aware of the quality of experience delivered to the users by the system. This enables the administrators to adjust the configuration of the system as needed when the quality deteriorates. Quality of experience may degrade generally due to problems in the network(s) or problems in the computing devices through which the media travels.

A user's quality of experience during an audio/video session may be measured by endpoints that generate, process, and render audio/video streams. The metrics associated with quality of experience may be calculated locally by each endpoint that participates in the session or remotely at a quality monitoring server. Individual metrics such as packet loss, audio quality degradation, dropped calls, and the like, may also be affected by each endpoint's capabilities, and measuring and/or aggregating the metrics independent of endpoints may provide only a partial picture of user's quality of experience.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to determining quality of experience by analyzing endpoint performance metric reports correlated with performance factors of each endpoint, and thereby obtaining a more complete view of an audio/video quality of experience in a unified communication system.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, quality of experience for users of a unified communication system may be determined by analyzing endpoint performance metric reports correlated with performance factors of each endpoint. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

While the term "call" is mainly used in examples throughout this document as referring to voice communications, it is not so limited. "Call" may also be used in reference to video communications, conference communications, instant messaging, and other forms of communication discussed herein in conjunction with estimating endpoint performance.

Figure 1:
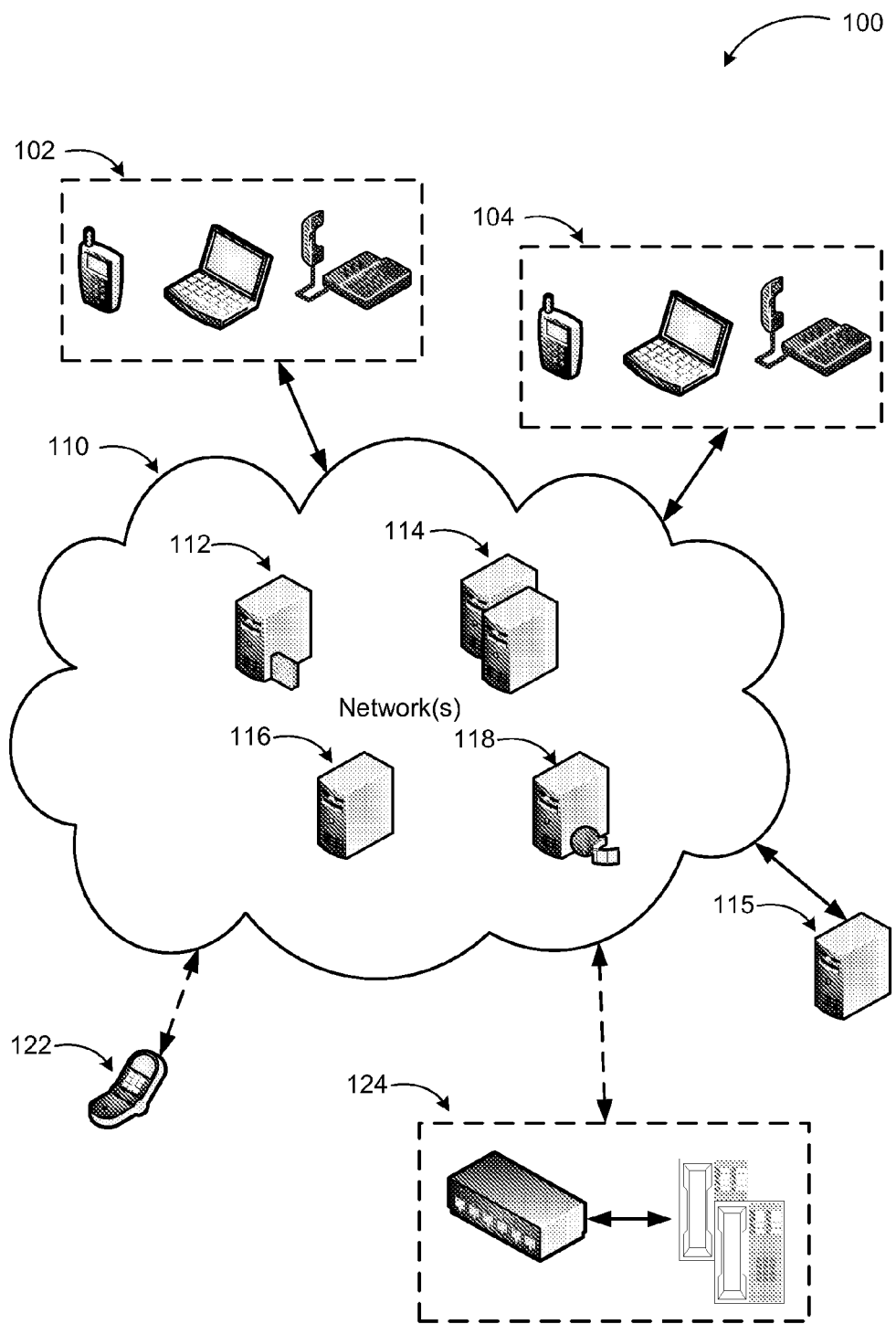
FIG. 1 is a diagram illustrating an example unified communications system.

Referring to FIG. 1, diagram 100 of an example unified communications system is illustrated. As discussed above, a system that supports multiple forms of communication with a complex interconnection of different networks and a large number of computing devices (servers, end devices, specialized devices, etc.) may experience degradation of quality in the experience delivered to the users due to problems in the network(s) or problems in the computing devices. Without a systematic and well defined approach, it may be difficult, if not impossible, to determine problematic devices in a system with a large number of computing devices. One approach for proactively and accurately improving and maintaining users' quality of experience is to collect metric data from all endpoints, analyze the metrics and take actions based on the analysis. To avoid unnecessary complexity, the metrics are typically chosen uniform (i.e. the same metric applies to a category of endpoints or to all endpoints). However, the situation may become more complicated by the fact that each endpoint has unique performance characteristics, attributes, etc.

Embodiments are directed to determining a performance of endpoints in a communication system quantitatively and systematically, taking into account characteristics and attributes of each endpoint and aggregating metric reports accordingly to address quality issues promptly and efficiently for the overall communication system.

In a unified communication system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network (PSTN). End devices may include any type of smart phone, cellular phone, any computing device executing a communication application, a smart automobile console, and advanced phone devices with additional functionality.

Unified Communication (UC) Network(s) 110 includes a number of servers performing different tasks. For example, UC servers 114 may provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent (e.g. Back-To-Back User Agent "B2BUA").

Quality Monitoring Server (QMS) 115 is tasked with collecting communication data such as statistical data associated with quantitative and/or qualitative aspects of communications from endpoints within the system. Endpoint is a general term referring to each end device as well as any server or specialized device that is directly involved with communications within UCN 110. For example, mediation server 116 and A/V conferencing server 118 are directly involved with the communication as nodes within the network. Therefore, performance of these servers may affect quality of communications (e.g. degradation due to delays in the servers), and thus they are considered endpoints. Any end device that enables a user to participate in UCN 110 by executing a communication application is also considered an endpoint.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method. End devices and servers may communicate with each other via SIP (e.g. collection of communication quality information by the QMS from each endpoint).

The SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

Voice and/or video communications are typically done over separate session protocols, typically Real Time Protocol ("RTP") or Real Time Control Protocol ("RTCP"). The metrics may be driven from these protocols.

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

While the example system is described with specific servers and SIP features in this and following figures, many other components (e.g. servers, firewalls, data stores, etc.) and protocols may be employed in implementing embodiments using the principles described herein. Functionality of the systems enabling estimation of endpoint performance may also be distributed among the components of the systems differently depending on component capabilities and system configurations.

Figure 2:
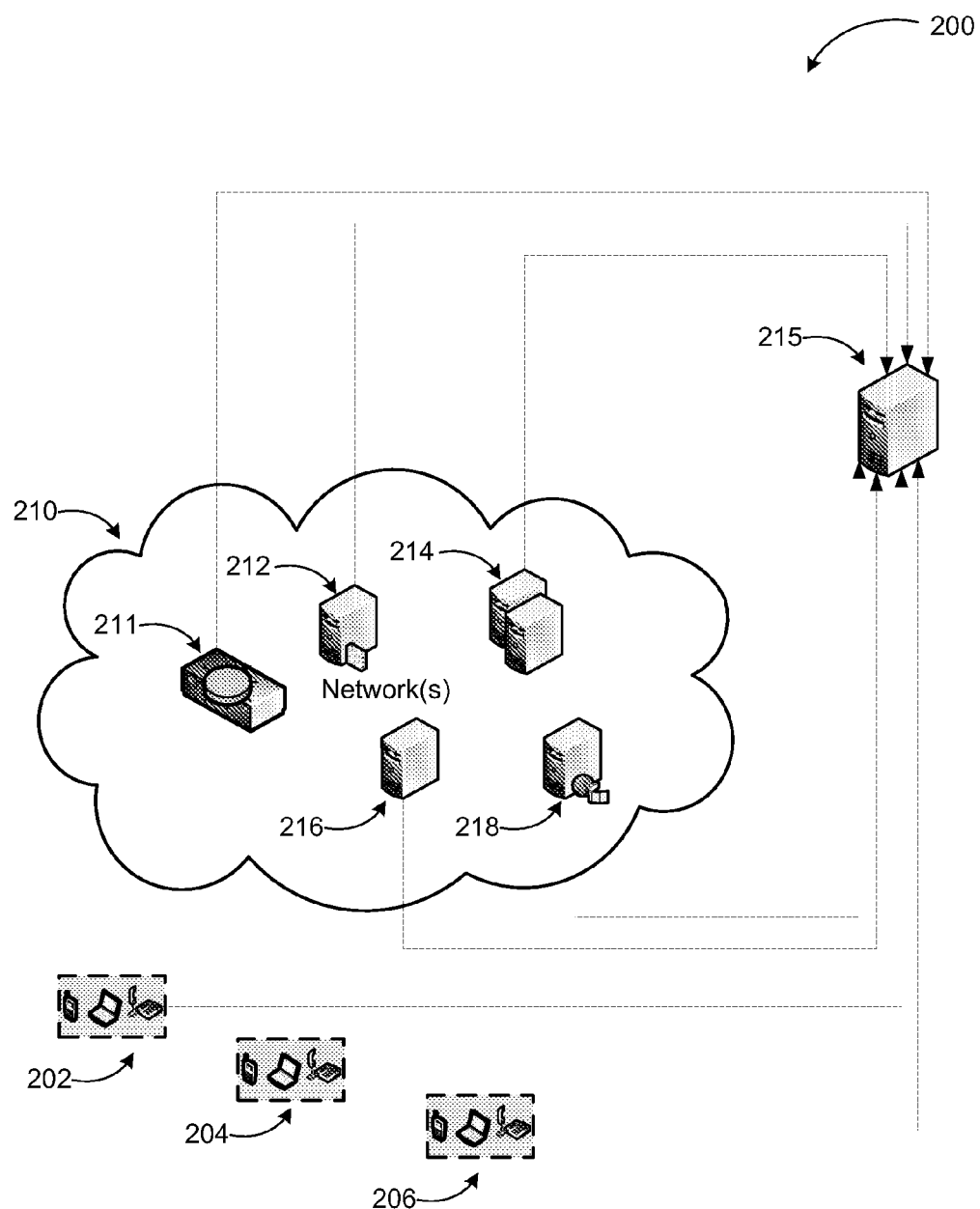
FIG. 2 illustrates a simplified unified communications system with communication quality information being collected by a quality monitoring server from endpoints within the system.

FIG. 2 illustrates a simplified unified communications system with communication quality information being collected by a quality monitoring server from endpoints within the system.

A number of metrics may be used in a communication system to determine performance quantitatively and/or qualitatively. A majority of these metrics may be measured by the endpoints (e.g. end devices, servers, etc.) during each call and then transmitted to QMS 215 for storage, aggregation, and analysis. The metrics may also be calculated by network agents that "sniff" signaling (SIP) and media (RTP/RTCP) packets. The metrics may be uniform (i.e. measured and collected by all endpoints) or specific (e.g. metrics specific for video communication capable end devices, metrics for servers only, and the like). While a system according to embodiments may utilize any metrics to estimate endpoint performance, example one are discussed herein.

Network 210 in diagram 200 includes in addition to access server 212, UC server(s) 214, A/V conferencing server 218, and mediation server 216, Multipoint Conferencing Unit (MCU) 211. MCU 211 is employed for facilitating conference calls, audio or video. Each of these servers as well as end devices 202, 204, and 206 are endpoints or machines that can affect communication quality. Thus, each machine may be configured to calculate call quality data and report the data to QMS 215 for analysis. Alternatively, the collected data may be aggregated at the endpoints and provided to QMS 215 upon request or periodically.

The example metrics according to a preferred embodiment include: call failure, network delay, Network Mean Opinion Score "NMOS" (predictive metrics based on network factors alone), Listen Mean Opinion Score "LMOS" (for decoded audio received by the reporting entity during a session as specified by ITU-TP800.1®), Send Mean Opinion Score "SMOS" (for pre-encoded audio sent by the reporting entity during a session as specified by ITU-TP800.1®), Conversation Mean Opinion Score "CMOS" (conversational clarity index for remote party as specified by ITU-TP562®).

In order to get a complete view of audio/video quality of experience and analyze the factors that affect it, metric reports from each endpoint that participates in a session may be collected, associated with the corresponding endpoints, and the results correlated with performance factors, such as platform attributes, capture/render devices, and health of other applications that share the platform (for example a PC with multiple applications).

The quality monitoring or system management application may collect statistics based on these factors and generate an appropriate report and/or alert. For example, collected data may be filtered for a report based on application type (soft phone, hard phone, gateway, etc.), processing capacity, memory size, camera type, audio/video drivers, and/or operating system.

In a typical system, many of the platform attributes are static and do not change during every call. Therefore, an endpoint may send its profile description to the quality monitoring or system management application once and update the profile whenever one of the attributes is changed. Afterwards, the endpoint may send for each session report only its profile identifier instead of sending the entire profile description.

If an endpoint is not capable of sending a metric report, other endpoints that exchange information with this endpoint, during a session, may include redundant information in their report to "cover up" the missing information. When the quality monitoring or system management application receives redundant information from two endpoints, it may use aggregation rules to select the most reliable source for each redundant metric.

An example category of endpoints comprises media endpoints, which are associated with handling and/or terminating media stream (audio/video). Metrics are collected from these endpoints that terminate media (audio/video) streams (RTP/RTCP). The object that is monitored is the media stream. However, the system may also collect a context for the stream (e.g. a call in which the stream was used and endpoints that sent and/or consumed this stream) in order to analyze this object. Embodiments are not limited to endpoints handling audio/video media only. As discussed previously, a UCN may facilitate many forms of communication and an endpoint according to embodiments may be associated with any of those communication modes.

According to some embodiments, three types of reports may be used for monitoring user quality experience:

Session Report—This report may include call (dialog) and stream metrics. It may be sent after call termination.

Intermediate Session Report—This report may include call (dialog) and stream metrics. It may be sent during a session based on a predefined period (e.g. every N seconds) and/or AV quality threshold.

Endpoint Media Profile Report—This report may include endpoint static data that affect AV quality such as platform hardware/software (OS) configuration and AV accessories, such as microphone, speakers, and camera.

As discussed previously, a system according to embodiments may require each endpoint to provide any one of these reports for itself as well as for the endpoint that is communicating with this endpoint (remote report). That way, if one endpoint is for some reason unable to provide its report, the information from the endpoint may be used to fill in the gap. If a report containing information about a remote endpoint as well as the local information is received from an endpoint, the report may be aggregated according to predefined rules such as selecting the report from the endpoint itself over any remote reports or any form of comparison of information contained in the reports.

By utilizing a standard protocol such as SIP and a standard format such as XML to generate and exchange the reports, the system can be open to third party hardware and software. Thus, the reports may be communicated and consumed by any third party module for analysis, scheduling, corrective actions, reporting, and so on. Furthermore, a real time communication system such as a unified communication system is typically configured to facilitate conferencing type communications between multiple participants. The above described aspects may be applied to conferences by associating the reports with a conference identifier and treating the conference as multiple dialogs using the principles described herein.

The above described metrics, reports, aggregations, and parameters are for example purposes and do not constitute a limitation on embodiments. Endpoint report aggregation in a unified communication system may be determined and computed using any defined metric, any type of report, and any computation using the principles described herein by ensuring proper correlation of collected metrics with endpoint profiles in the final analysis.

Figure 3:
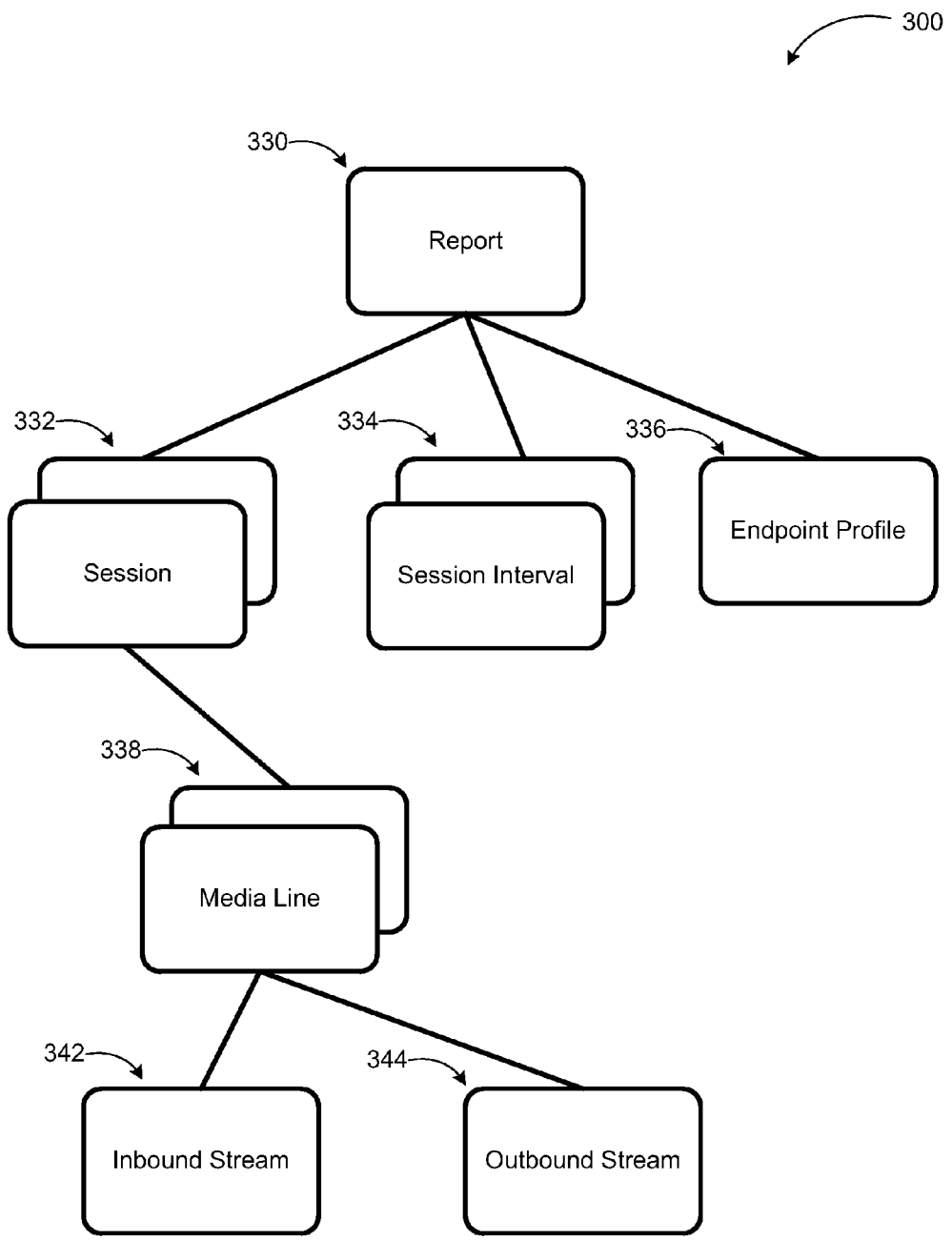
FIG. 3 is a conceptual diagram, illustrating aggregation of information for quality of experience reports according to embodiments.

FIG. 3 is a conceptual diagram, illustrating aggregation of information for quality of experience reports according to embodiments. Components of report aggregation in a system according to embodiments are represented as objects.

Inbound and outbound streams 342 and 344 are objects representing exchange of information (e.g. voice call, video call) between two endpoints. They are directional media streams from endpoint perspective. Media line 338 represents a communication channel between endpoints in a session (or dialog). Each session may include multiple media lines. A typical audio call may have only one media line, while a typical video call may have one audio media line and one video media line. On the other hand, calls with different quality attributes (e.g. video conferences with various resolutions such as HD, VGA, CIF, etc.) may include multiple media lines for the same session. A media line according to some embodiments may have only one stream in one direction.

A session is equivalent to a call and a SIP dialog. A single report (e.g. 330) may include reports for multiple sessions 332. Report 330 may be sent at the end of each session 332, during the session as session interval report (334), or as endpoint profile report (336) whenever there is a change to the endpoint profile.

Part or all of the information included in report 330 may be stored in a data store for retrieval by another application, provided directly to a presentation, analysis, or scheduling application (for scheduling service). Alert(s) may be issued based on the performance values in the report 330. For example, if the number of dropped calls for an endpoint exceeds a predetermined threshold, an alert in form or a call, a voicemail, an email, an instant message, etc. may be transmitted to an administrator. Report 330 may also be provided textually or graphically through any user interface to an administrator.

Figure 4:
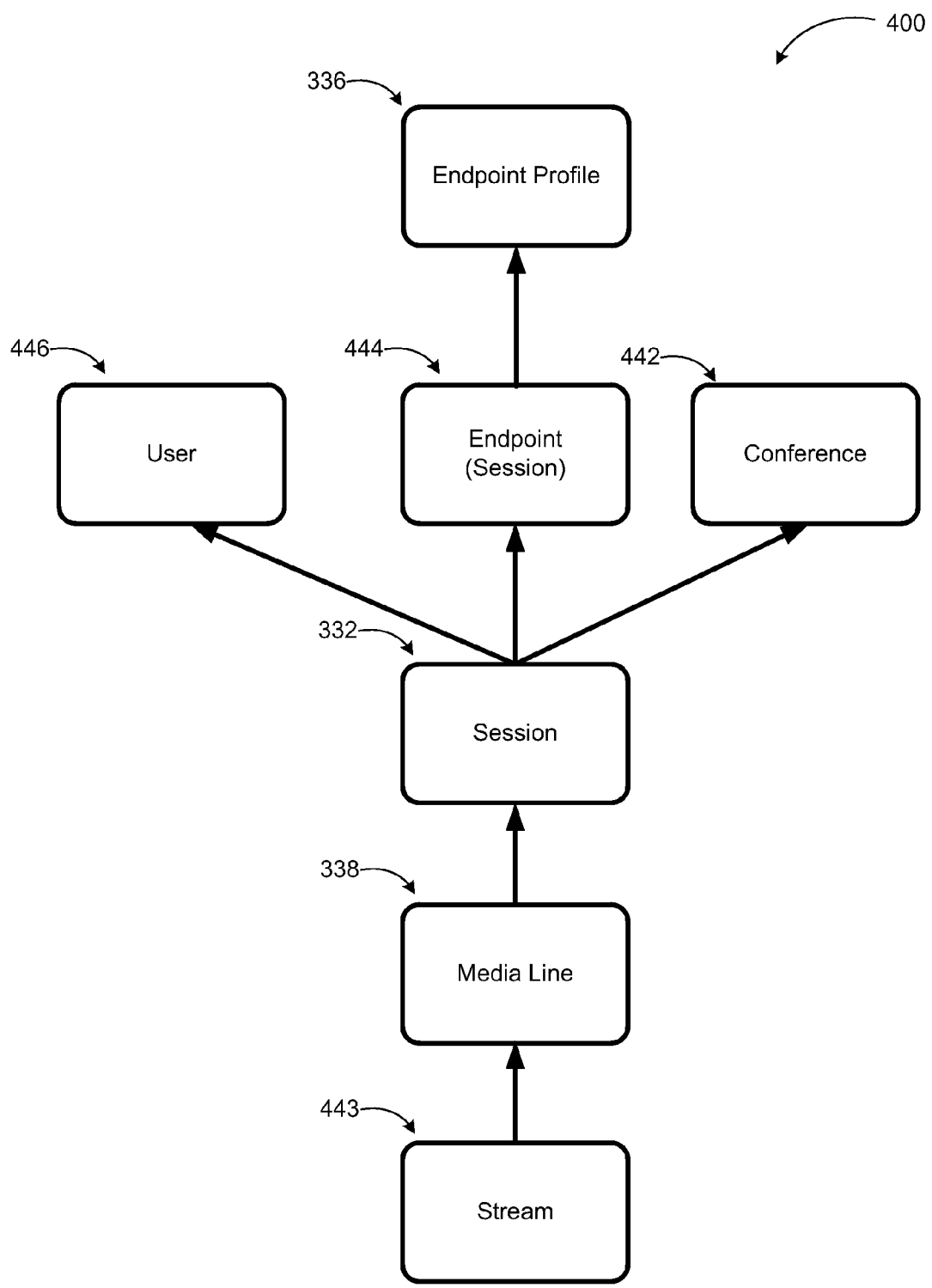
FIG. 4 is another diagram illustrating relationships between major components in obtaining a quality report.

FIG. 4 is another diagram illustrating relationships between major objects of an endpoint a quality experience report. Stream 443 and media line 338 are unique objects within each session 332. Each session, on the other hand, may be assigned a globally unique identifier such as a SIP dialog ID.

If the endpoint device is an end device associated with one or more users, a user (446) participating in the session may be assigned a globally unique SIP URI to identify the user within the report. Endpoint (session) 444 object represents the physical device involved in the session and may also be identified with a globally unique identifier such as its computer name. Conference 442 object is identified by a globally unique identifier as well to associate one or more dialogs as belonging to the same conference. The identifications of these objects are included in the endpoint profile 336 for accurate analysis of measured metrics taking into account endpoint characteristics such as hardware and software platform attributes (CPU, Memory, OS name and version, etc.).

An example partial report according to one embodiment may look like:

```
<VQReportEvent>
  <VQSessionReport SessionId="1j9FpLxk3uxtm8tn;from-tag=123;
  to-tag=678">
    <Endpoint Name="alice111.redmond.corp.microsoft.com">
    </Endpoint>
    <DialogInfo CallId="1j9FpLxk3uxtm8tn" from-tag="123" to-tag=
    "678">
      <FromURI>sip:alice@microsoft.com</AnsweredURI>
      <ToURI>sip:bob@microsoft.com</ToURI>
      <AnsweredURI>sip:+14251231234@microsoft.com</ToURI>
      <Caller>true</Caller>
  <LocalContactURI>sip:alice@microsoft.com;opaque=
  user:epid:K6m2gIHsKFG BHz-dEzb3LQAA;gruu</LocalContactURI>
      <RemoteContactURI>sip:TUK-LSMS-</RemoteContactURI>
      <LocalUserAgent>UCCP/2.0.5970.504 OC/2.0.5970.504
      </LocalUserAgent>
      <RemoteUserAgent>RTCC/3.0.0.0 MediationServer
      </RemoteUserAgent>
    </DialogInfo>
    <MediaLine Id="main-audio" >
      <Description>
```

This may be followed by the listing of various attributes and characteristics of the media line. Similar portions may be included in the report for the other objects discussed above.

An example schema format according to another embodiment may look like:

```
ENDPOINT PLATFORM TYPE
<xs:complexType name="HardwareType">
<xs:sequence>
  <xs:element name="Name" type="xs:string" minOccurs="0" />
  <xs:element name="MACAddr" type="xs:string" minOccurs="0"
  maxOccurs="unbounded" />
  <xs:element name="CPU" type="xs:string" minOccurs="0" />
  <xs:element name="Memory" type="xs:unsignedLong"
  minOccurs="0" />
  <xs:any namespace="##other" processContents="lax"
  minOccurs="0" maxOccurs="unbounded" />
</xs:sequence>
</xs:complexType>
    ENDPOINT MEEDIA METRICSTYPE
<xs:complexType name="EndpointMediaMetricsType">
<xs:choice>
  <xs:element name="Audio" type="tns:AudioEndpointMetricsType" />
  <xs:element name="Video" type="tns:VideoEndpointMetricsType" />
  <xs:any namespace="##other" processContents="lax"
  maxOccurs="unbounded" />
</xs:choice>
  <xs:anyAttribute namespace="##other" processContents="lax" />
</xs:complexType>
```

As the example portions show, endpoint device's platform type, metrics types, and so on, may be represented as objects in XML format such that the measured metrics can be associated with these and other characteristics of the endpoint.

The report portions, objects, endpoint attributes and characteristics, as well as components of a unified communication system aggregating endpoint reports by associating them with endpoint profiles, described in FIGS. 3 and 4 are exemplary for illustration purposes. A unified communication system according to embodiments may be implemented using additional or fewer components and other schemes using the principles described herein.

Figure 5:
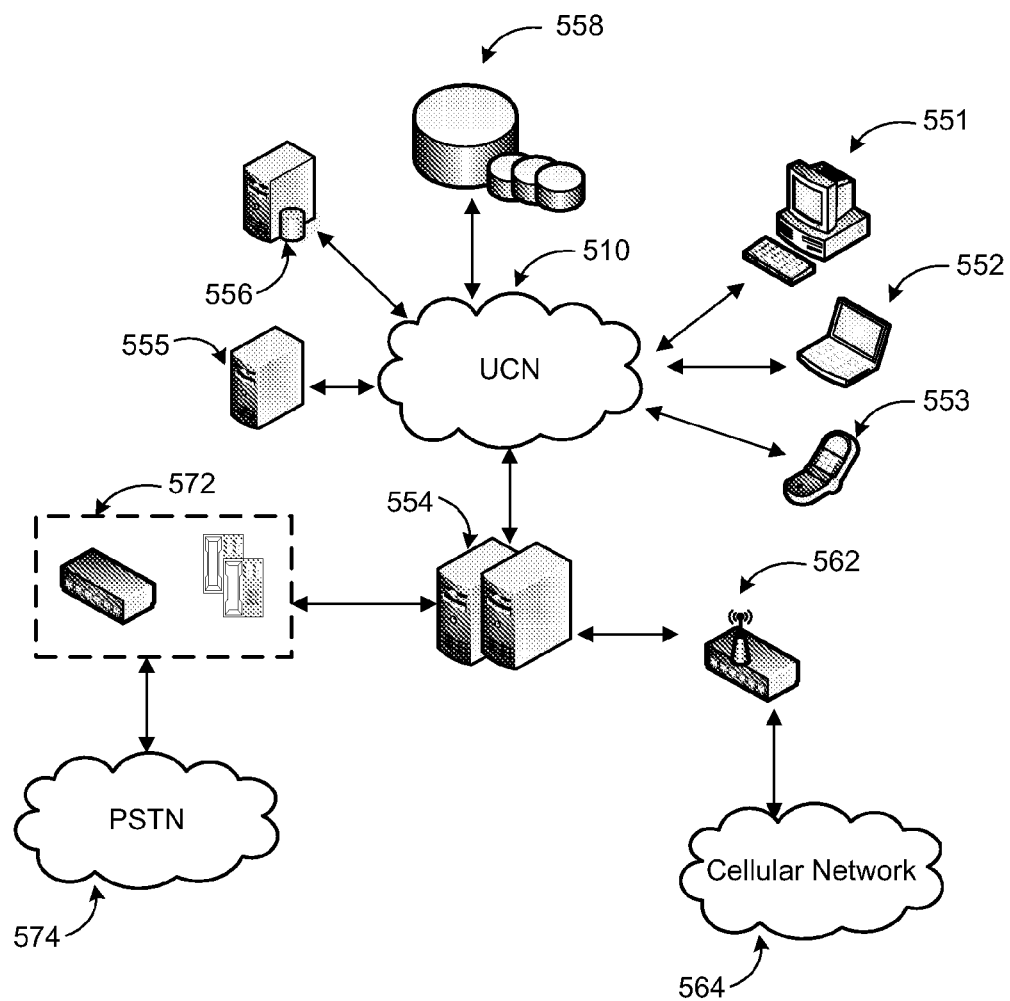
FIG. 5 illustrates a networked environment where embodiments may be implemented.

FIG. 5 is an example networked environment, where embodiments may be implemented. Endpoint performance report aggregation as described previously may be implemented locally or in a distributed manner over a number of physical and virtual clients and servers. Such a system may typically involve one or more networks such as PSTN 574, cellular network 564, and UCN 510. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. A system according to embodiments may involve many more components, typical and relevant ones are discussed in conjunction with this figure.

Mediation server(s) 554 may provide signaling and media exchange between the different systems. A PBX 572 and an RF modem 562 may be used for connection between the PSTN and the cellular networks, respectively, and the mediation server(s) 554. Client devices 551-553 communicate with each other and with devices on other networks through UCN 510. The UC system may also include a UC server (not shown) for registering, routing, and other functionality.

QMS server 555 may monitor communication user quality experience within the system by collecting quantitative and qualitative call information from endpoints, aggregating the information, and determining endpoint performance based on predefined rules. The endpoints, which may include servers (e.g. mediation servers 554, end devices (e.g. 551-553), and other devices associated with a unified communication network, each provide collected data on user quality experience to QMS server 555. The information may be provided at the end of each call/session (voice or otherwise), during the call, or aggregated and provided upon request or periodically. The information may be provided directly to QMS 555 via a protocol such as SIP or through an intermediary device. For example, each endpoint may store their collected information in a network data store (e.g. data stores 558) and QMS 555 may retrieve the data from the data store later for analysis. The information may be provided in any form such as simple SIP message, Extended Markup Language (XML) data, and the like. Furthermore, each endpoint may collect the same type of information (same metrics) or different metrics based on their capabilities, and so on.

As mentioned above, data associated with the system configuration (e.g. user names, phone numbers, call policies, configuration, records, etc.), metrics, metric values, and so on, may be stored in one or more data stores such as data stores 558, which may be directly accessed by the servers and/or clients of the system or managed through a database server 556. UCN 510 provides the backbone of the UC system and may employ a number of protocols such as SIP, RTP, and the like. Client devices (e.g. 551-553) provide platforms for UCN user endpoints. Users may access the communication system using a client device or one or more client applications running on a client device.

UCN 510 provides communication between the nodes described herein. By way of example, and not limitation, UCN 510 may include wired media such as a wired network or direct-wired connection, and wireless media such as acoustic, RF, infrared and other wireless media.

Many other configurations of computing devices, applications, data sources, data distribution systems may be employed to implement endpoint performance report aggregation. Furthermore, the networked environments discussed in FIG. 5 are for illustration purposes only. Embodiments are not limited to the example applications, modules, or processes.

Figure 6:
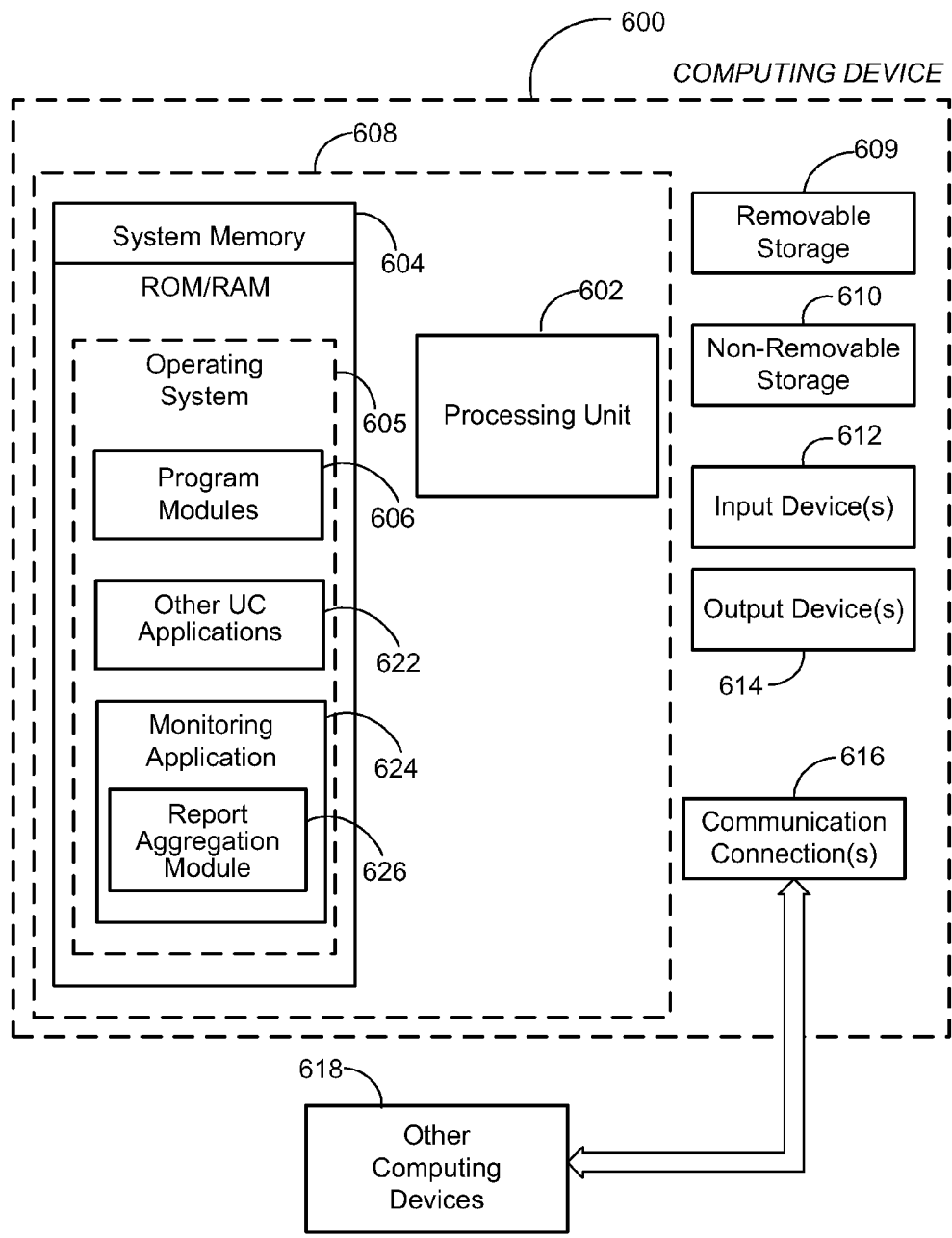
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a server executing a communication quality monitoring application for addressing communication quality problems in a unified communication system. Computing device 600 may typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the computing device, such as the WINDOWS® operating systems from MICROSOFT CORPORATION of Redmond, Wash. The system memory 604 may also include one or more software applications such as program modules 606, other UC applications 622, and monitoring application 624 with its report aggregation module 626.

Other UC applications 622 may be separate applications or integral modules of a hosted service application that provide advanced communication services through computing device 600 such signal routing, registration, and communication facilitation services with the end devices of the UC system, as described previously. Monitoring application 624 collects data associated with endpoint performance from the endpoints such as the metrics described previously. The collected data is associated with endpoint profiles and correlated according to aggregation rules such that redundant information is eliminated, for example. The aggregated report data is then used for providing administrators with a system performance report, issuing alerts for problems needing immediate attention, etc. The correlation and aggregation may be performed by monitoring application 624, the report aggregation module 626 within the application, or by a separate module. This basic configuration is illustrated in FIG. 6 by those components within dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include client devices and servers of the UC network defined as endpoints above. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
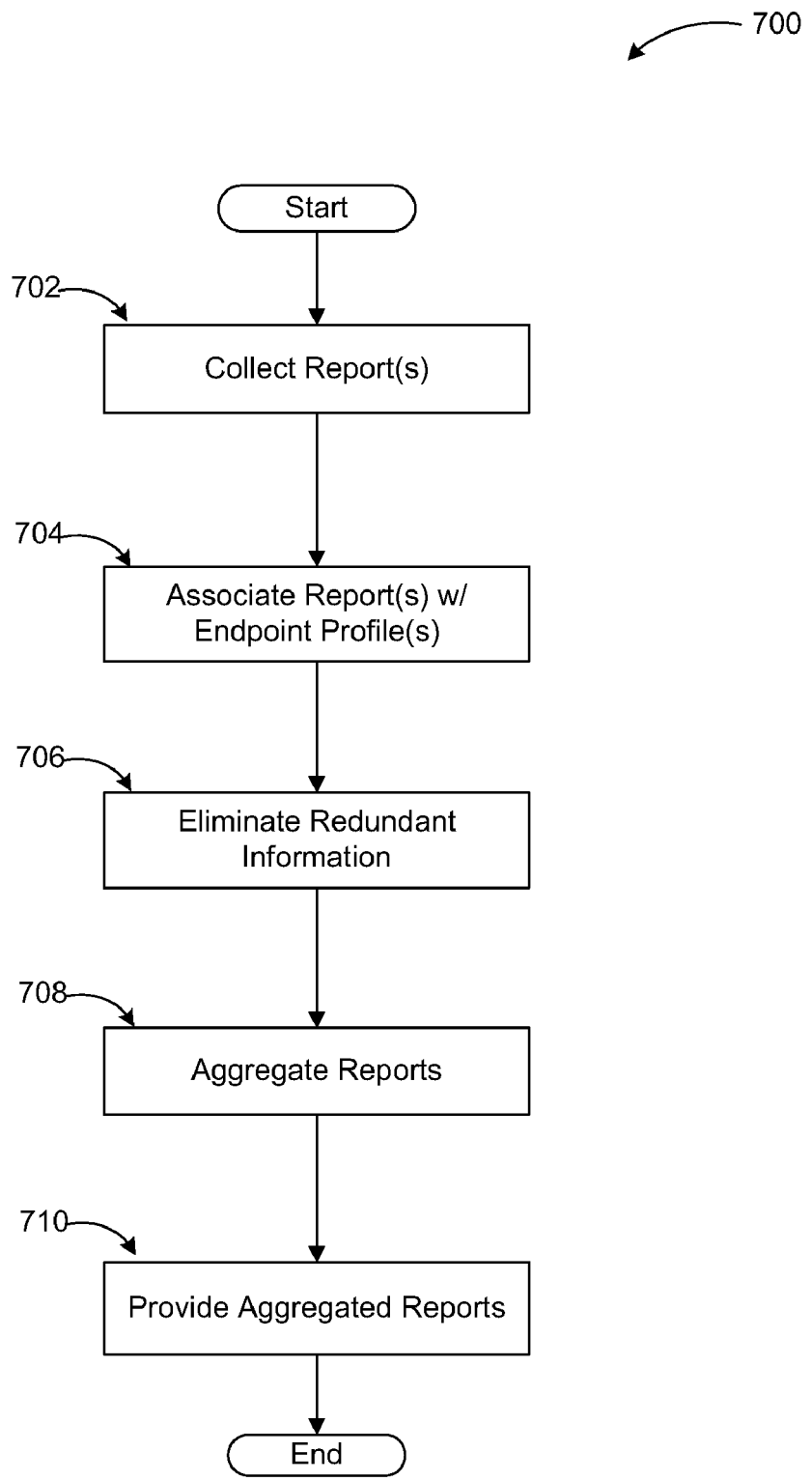
FIG. 7 illustrates a logic flow diagram for a process of endpoint performance report aggregation according to embodiments.

FIG. 7 illustrates a logic flow diagram for process 700 of endpoint performance report aggregation according to embodiments. Process 700 may be implemented in a quality monitoring server of a unified communication system.

Process 700 begins with operation 702, where metric reports associated with communication quality are collected from each endpoint. As mentioned previously, the data may be about any form of communication and may be collected during or at the end of each call, periodically, or upon request by the quality monitoring server. While not shown in the flow diagram, each endpoint may send its endpoint profile information once when they come online and again when there is a change to any one of the attributes included in their profile. Processing advances from operation 702 to operation 704.

At operation 704, the collected reports are associated with corresponding endpoint profiles as discussed previously. Processing continues to operation 706 from operation 704, where redundant information is eliminated. In filtering redundant information, the quality monitoring application or the management system may relay on aggregation rules such as who the source of the information is. For example, if an endpoint provides profile and/or metric information about itself and the same or similar information is received from another endpoint communicating with the first endpoint, the second endpoint's (or the remote) information is eliminated since the first hand information is assumed to be more reliable. Processing moves from operation 706 to operation 708.

At operation 708, the reports are aggregated based on additional aggregation rules. The aggregation of report data includes consideration of endpoint profiles providing a more accurate view of endpoint performances based on their performance metrics and their characteristics/attributes. Processing advances from operation 708 to operation 710.

At operation 710, the aggregated reports are provided to an administrator, another application, and so on for display or further processing (e.g. analysis, storage). Alternatively, alerts may be issued based on predefined thresholds for endpoint performance such that quality degradations may be addressed proactively. After operation 710, processing moves to a calling process for further actions.

The operations included in process 700 are for illustration purposes. Endpoint report aggregation in unified communication systems may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device for aggregating endpoint reports in a unified communication network (UCN), the method comprising:
receiving a plurality of endpoint profiles from a plurality of endpoints, wherein each endpoint profile of the plurality of endpoint profiles corresponds to one of the plurality of endpoints, and wherein each endpoint profile has endpoint attributes corresponding to the one of the plurality of endpoints comprising:
an endpoint name,
an endpoint hardware configuration, and
an endpoint software configuration;
receiving metric data associated with a plurality of call metrics for at least one communication session between two or more endpoints of the plurality of endpoints, wherein the metric data is received from at least one of the two or more endpoints;
correlating the metric data with two or more endpoint profiles corresponding to the two or more endpoints, wherein correlating the metric data with the two or more endpoint profiles comprises associating at least a portion of the metric data with at least two or more endpoint attributes corresponding to the two or more endpoints;
aggregating the correlated metric data and the two or more endpoint profiles based on predefined aggregation rules; and
generating a performance report based on the aggregated metric data and the two or more endpoint profiles, wherein the performance report identifies the two or more endpoint attributes as associated with at least the portion of the metric data, wherein the metric data is collected and the performance report is generated using object representations for aspects of the at least one communication session between the two or more endpoints, and wherein the object representations comprise:
at least one session object representing the at least one communication session;
at least one media line object representing at least one communication channel between the two or more endpoints during the at least one communication session; and
at least one stream object representing an exchange of information between the two or more endpoints, wherein the exchange of information comprises at least one of: an audio exchange, a video exchange, an instant message exchange, and a data exchange.

2. The method of claim 1, further comprising:
rendering the performance report through at least one from a set of: displaying on a user interface, storing for subsequent retrieval, and providing to one of an analysis application, a scheduling application, and a presentation application.

3. The method of claim 1, wherein the metric data is collected at one of: a conclusion of the at least one communication session and an expiration of a predefined period.

4. The method of claim 3, further comprising issuing an alert in response to exceeding a predefined threshold value for metric data associated with at least one of the plurality of call metrics, wherein the alert is issued as one of: a voice call, an instant message, an audio indication, a visual indication, and an audio-visual indication.

5. The method of claim 1, wherein each endpoint profile corresponding to each of the plurality of endpoints has endpoint attributes further comprising at least one of: an endpoint application type, an endpoint driver type, and an endpoint operating system.

6. The method of claim 5, wherein the endpoint attributes corresponding to each endpoint profile are collected for a first time when each endpoint of the plurality of endpoints becomes active and again only when the endpoint attributes change.

7. The method of claim 1, further comprising:
collecting first endpoint attributes corresponding to a first endpoint profile of a first endpoint from the first endpoint; and
collecting second endpoint attributes corresponding to a second endpoint profile of the first endpoint from a remote endpoint communicating with the first endpoint, wherein the first endpoint attributes are more reliable than the second endpoint attributes.

8. The method of claim 7, further comprising aggregating the correlated metric data based on the first endpoint attributes corresponding to the first endpoint.

9. The method of claim 7, further comprising selecting the first endpoint attributes corresponding to the first endpoint profile from the first endpoint over endpoint attributes from other endpoints for the first endpoint when the first endpoint attributes corresponding to the first endpoint profile are available from the first endpoint.

10. The method of claim 1, wherein the endpoint profiles corresponding to each of the two or more endpoints and the metric data are collected utilizing a standardized communication protocol and the performance report is generated utilizing a standard format such that the report is transmittable to and consumable by any application for one of: analysis, scheduling, performing corrective actions, and presentation.

11. The method of claim 1, wherein the metric data associated with the plurality of call metrics are one of uniform for all endpoints of the plurality of endpoints and specific to at least one group of endpoints of the plurality of endpoints.

12. The method of claim 11, wherein the plurality of endpoints include one of: an end device for facilitating communication through the UCN, an access server, a mediation server, an audio/video conferencing server, and a multipoint conferencing unit.

13. The method of claim 1, wherein the at least one communication session includes one of: a voice call, a video call, an audio conference, a video conference, an instant message session, an electronic mail exchange, an application sharing session, and a data sharing session.

14. A computer-readable storage medium not consisting of a modulated data signal and having instructions stored thereon for aggregating endpoint performance reports in a unified communication network (UCN), the instructions comprising:
    receiving a plurality of endpoint profiles from a plurality of endpoints, wherein each endpoint profile of the plurality of endpoint profiles corresponds to one of the plurality of endpoints, and wherein each endpoint profile has endpoint attributes corresponding to the one of the plurality of endpoints comprising: an endpoint application type, an endpoint processing capacity, an endpoint memory capacity, an endpoint driver type, an endpoint operating system, and an endpoint communication characteristic;
    collecting metric data associated with one or more communication sessions between two or more endpoints of the plurality of endpoints, wherein each communication session of the one or more communication sessions includes at least one of: a voice call, a video call, an audio conference, a video conference, an instant message session, an electronic mail exchange, an application sharing session, and a data sharing session;
    correlating the metric data with two or more endpoint profiles corresponding to the two or more endpoints, wherein correlating the metric data with the two or more endpoint profiles comprises associating at least a portion of the metric data with two or more endpoint attributes corresponding to the two or more endpoints;
    aggregating the correlated metric data and the two or more endpoint profiles based on predefined aggregation rules, wherein the aggregation rules include selection of appropriate metric data for each endpoint if the metric data is collected from a plurality of sources;
    generating a performance report in a standard format based on the aggregated correlated metric data and the two or more endpoint profiles, wherein the performance report identifies at least the two or more endpoint attributes as associated with at least the portion of the metric data, wherein the metric data is collected and the performance report is generated using object representations for aspects of the one or more communication sessions between the two or more endpoints, and wherein the object representations comprise:
        at least one session object representing at least one of the one or more communication sessions;
        at least one media line object representing at least one communication channel between the two or more endpoints during at least one of the one or more communication sessions; and
        at least one stream object representing an exchange of information between the two or more endpoints, wherein the exchange of information comprises at least one of: an audio exchange, a video exchange, an instant message exchange, and a data exchange; and
    rendering the performance report via one of: displaying on a user interface, storing for subsequent retrieval, and providing to one of an analysis application, a scheduling application, and a presentation application.

15. The computer-readable storage medium of claim 14, wherein the metric data is collected multiple times during each communication session in response to one of: an expiration of a predefined period and exceeding of a predefined threshold value.

16. The computer-readable storage medium of claim 14, wherein selection of appropriate metric data includes selection of metric data received from an endpoint that locally collected the metric data and corresponding endpoint profile over metric data received from another endpoint that remotely collected the metric data and the corresponding endpoint profile for the endpoint during a communication session.

17. A system for aggregating endpoint performance reports in a unified communication network (UCN), the system comprising:
    a quality monitoring server (QMS) comprising at least one processing unit and at least one memory communicatively coupled to the at least one processing unit and containing computer-readable instructions that when executed by the at least one processor perform the following steps:
receiving a plurality of endpoint profiles from a plurality of endpoints, wherein each endpoint profile of the plurality of endpoint profiles corresponds to one of the plurality of endpoints, and wherein each endpoint profile has endpoint attributes corresponding to the one of the plurality of endpoints comprising:
    an endpoint name,
    an endpoint hardware configuration, and
    an endpoint software configuration;
receiving metric data associated with a plurality of call metrics for at least one communication session between two or more endpoints of the plurality of endpoints, wherein the metric data is received from at least one of the two or more endpoints;
correlating the metric data with two or more endpoint profiles corresponding to the two or more endpoints, wherein correlating the metric data with the two or more endpoint profiles comprises associating at least a portion of the metric data with two or more endpoint attributes corresponding to the two or more endpoints;

aggregating the correlated metric data and the two or more endpoint profiles based on predefined aggregation rules; and
generating a performance report based on the aggregated metric data and the two or more endpoint profiles, wherein the performance report identifies the two or more endpoint attributes as associated with at least the portion of the metric data, wherein the metric data is collected and the performance report is generated using object representations for aspects of the at least one communication session between the two or more endpoints, and wherein the object representations comprise:
- at least one session object representing the at least one communication session;
- at least one media line object representing at least one communication channel between the two or more endpoints during the at least one communication session; and
- at least one stream object representing an exchange of information between the two or more endpoints, wherein the exchange of information comprises at least one of: an audio exchange, a video exchange, an instant message exchange, and a data exchange.

18. The system of claim 17, wherein the two or more endpoints are within a conference, further comprising:
- correlating the metric data for the at least one communication session under a conference object using a conference identifier.

19. The system of claim 17, wherein the plurality of endpoints include at least one of: an end device for facilitating communication through the UCN, an access server, a mediation server, an audio/video conferencing server, and a multipoint conferencing unit.

* * * * *